May 13, 1947.  J. ALBERTOLI  2,420,343
CAN UNLOADING APPARATUS
Filed March 29, 1945
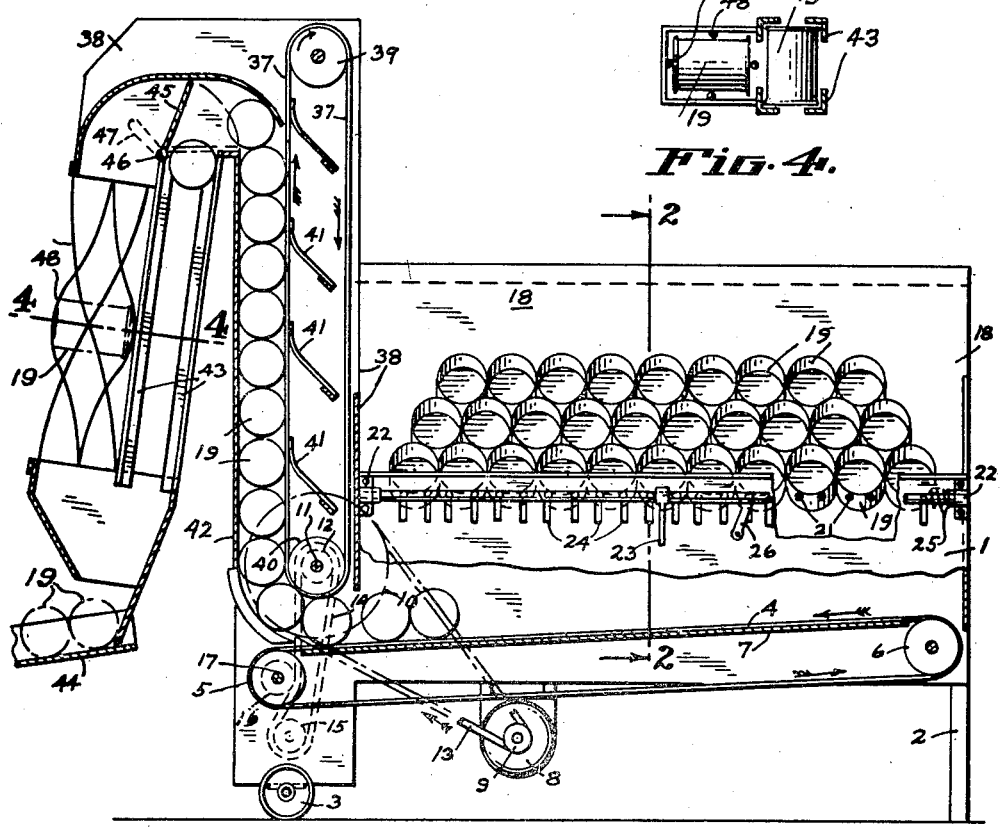
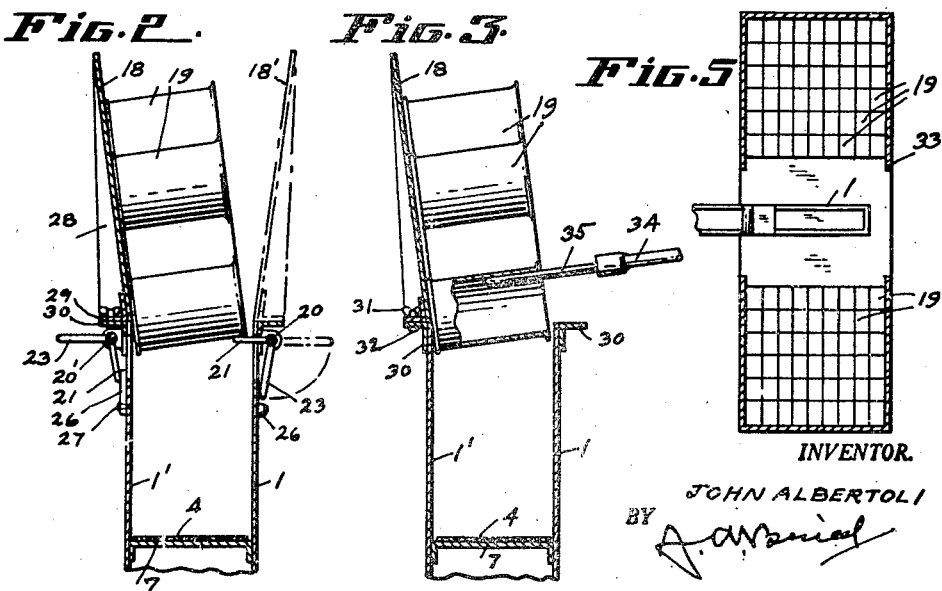
INVENTOR.
JOHN ALBERTOLI
BY
ATTORNEY Patented May 13, 1947

2,420,343

UNITED STATES PATENT OFFICE 2,420,343

CAN UNLOADING APPARATUS

John Albertoli, San Francisco, Calif.

Application March 29, 1945, Serial No. 585,483

8 Claims. (Cl. 198—33)

This invention relates to apparatus for unloading loose cans from freight cars or warehouses wherein they may be stacked.

The principal object of the invention is to provide such apparatus which will facilitate the unloading and transportation of a car load of empty cans received to a cannery where they are to be used.

Particular features and advantages of the invention will appear in the following description and in the accompanying drawings.

In the drawings:

Fig. 1 is a side elevation of my improved can unloading apparatus with portions broken away to reveal the inner arrangement of its parts.

Fig. 2 is a vertical cross section of Fig. 1 taken along the line 2—2 of Fig. 1 and showing the latch bar holding a stack of cans in place for dropping to the discharging conveyor.

Fig. 3 is a view like that of Fig. 2 but showing the stack of cans manually supported over the apparatus on a special pitch-fork.

Fig. 4 is a cross section of the can twisting guide as taken along the line 4—4 of Fig. 1.

Fig. 5 is a much smaller scale view showing a horizontal section of a railroad box car with both ends stacked with cans, and with my unloading apparatus positioned in the car preparatory to unloading of the cans therewith.

Before describing the drawings in detail the apparatus may be described as a portable elongated receiving bin in which successive stacks of cans are manually placed, to fall to a conveyor at the bottom of the bin which transports the cans to an elevator from the top of which they fall down to a gravity chute or another conveyor for rolling or transporting from the car to the cannery or warehouse.

As the cans generally handled with the apparatus are open at one end, and they are stacked in the opposite ends of the box car horizontally with open ends toward the center of the car, means is provided on the gravity chute to turn the cans end for end as may be required to have the finally discharged cans all pointing one way— whichever is required—at the particular cannery or warehouse.

In the drawings, 1 is the elongated bin, provided with a pair of legs 2 at one end and a pair of rollers or casters 3 at the other end.

The bin is preferably of sheet metal and is of a width within its front 1 and rear 1' walls to freely receive a stack of cans lying transversely one above the other.

At the lower portion of the bin is an endless belt conveyor with its belt 4 passing over head and tail pulleys 5, 6 and with the upper run of the belt slidably supported on a bottom plate 7 secured to the bin walls and preferably inclined downwardly toward the discharge end.

The belt conveyor is driven by any suitable form of power and transmission, here indicated as by an electric motor 8 carried by the bin structure and with its pulley 9 belted as at 13 to a large pulley 10 on a shaft 11 in turn mounting a small pulley 12 belted as at 14 over an idler 15 and with one run of the belt 14 in driving contact with a small pulley 16 secured to the head shaft 17 which drives the conveyor head pulley 5.

Extending slantingly backward above the rear wall 1' of the bin is a large plate 18 against which the cans 19 are stacked preparatory to falling to the conveyor and are temporarily supported in such position by releasable means here shown as a latch bar 20 provided with fingers 21 which, by turning the bar, can be projected under the lower row of cans, as indicated in Fig. 2, to keep them from falling.

The latch bar 20 extends along the edge of the bin and is rotatably supported in end bearings 22, and provided with a handle 23 for turning the bar so that when the handle 23 is down against the side of the bin the row of fingers will be in the way of the cans to support them, and when the handle is lifted to dotted position the fingers will turn down and come out through slots 24 in the wall of the bin to let the cans pass as they fall to the conveyor 4. Preferably there is a spring 25 to normally turn the bar so as to have the fingers projecting inward in can stopping position, and a latch 26 pivoted to the bin as at 27 which may be swung under any of the fingers when turned down and out, so as to hold them all out and as shown at the left side of Fig. 2 where a duplicate latch bar 20 runs along the wall 1' of the bin. The spring 25 may be arranged in any desired manner, but is here indicated as wrapped around the bar 20 and with one end secured to the bar and the other end secured to the adjacent bearing 22.

Sheet metal plate 18 is preferably reinforced or stiffened as by several ribs 28 secured to its rear side, and is provided with a flange 29 at its lower edge which detachably bolts to fixed flange 30 secured along the edge of the bin. Thumb nuts 31 on bolts 32 provide for easy attaching or removing of the plate, so that it may be attached to either edge of the bin as indicated by the dotted position 18' in Fig. 2 so as to permit working from one side to unload one end of a car, then from the other side to unload the other end of the car, and as will be understood with reference to Fig. 5 where the railroad box car is designated 33 and where the bin 1 of the apparatus is positioned in the doorway passage between the loaded ends of the car, and a workman can work between the receiving bin 1 and the cans 19 at either side. The workman preferably uses a special pitchfork (indicated at 34 in Fig. 3) and which has a row of tines 35 one spaced for each can and as many in the row as the length of the row of cans it is desired to lift at one time. This fork is slipped into the open ends of the cans about three or four rows below the top of the pile and lifted to carry all of the cans which will stay on it—say the thirty cans shown in Fig. 1 of the drawing—and place them over the bin 1 as shown in Fig. 3 against the rear plate 18, then by lowering the fork until it rests on the upper edge 30 of the bin, the fork may be withdrawn and the cans will all fall to the conveyor 4. However, if the bin is fitted with the latch bars 20 as described, the stop fingers 21 will be projecting inwardly of the bin and will support the stack of cans in the position shown in Fig. 2 until the handle 23 of the forward latch bar is lifted to withdraw the fingers and permit the cans to fall. If the stack of cans when fallen into the bin is so high that the upper row or two still come above the position of the then retracted fingers, the handle 23 is held up until enough of the cans have been carried away by the conveyor to lower the pile and permit the fingers to swing inwardly again for the next stack of cans to come.

The conveyor carries the cans from the bin under an elevator which carries them to the top of the gravity chute. The elevator here shown comprises an endless belt 37 operating within a casing 38 over an upper pulley 39 and a lower pulley 40 secured to shaft 11 and driven thereby and the upward run of which belt is resiliently pressed as by leaf springs 41 against the cans 19 and rolls them up against a fixed outer wall 42 of the casing as indicated in Fig. 1 to fall down the gravity chute 43 to finally roll out on a discharge chute or conveyor 44 which may extend to the warehouse, or to another conveyor, not shown, for carrying the cans wherever desired.

If the workman is taking cans from an end of the box car 33 which results in the cans "pointing" the wrong way as they are discharged on conveyor or chute 44, a gate 45 at the top of the gravity chute pivoted on an axle 46 provided with an operating handle 47 at the outer side of the chute casing 38, is swung down to the dotted horizontal position to close off chute 43 and thus make the cans from the elevator roll over the gate 45 to fall through a spiral gravity chute 48 which may be made of wire as indicated so as to turn the descending cans 180° to reverse their open ends to point in the opposite direction when they reach the discharge conveyor or chute 44. As such spiral can reversing chutes are in themselves old in the art (see my U. S. Patent No. 1,815,029 of July 21, 1931), no further description of the construction would seem necessary.

From the above description it will be seen that a large box car of cans may be quickly unloaded with the aid of this apparatus and while it is particularly valuable for the unloading of empty cans it is evident that it will also function with filled cans if desired.

Having thus described my can unloading apparatus, what I claim is:

1. A can unloading apparatus comprising an elongated bin with side walls spaced to freely receive a stack of cans one can in depth, said bin being freely open on top and provided with a bottom plate slanting downwardly toward one end of the bin, an elevator arranged to receive the cans adjacent the lower end of the bin and elevate them to a point higher than the top, and a chute extending downward from the top of the elevator into which the elevator discharges the cans, said chute formed with two downward extending passages for the gravity descent of the cans, one passage provided with guides to hold the descending cans in alignment, and the other passage provided with twisted guides to turn the descending cans end for end in going through, and means for switching the cans from the elevator to either of the two passages.

2. A can unloading apparatus comprising an elongated bin with confronting side walls spaced to freely receive a stack of round cans one can only in depth with the cans all extending transversely of the stack, said bin being freely open on top to receive the stack of cans and provided with guiding means extending above said bin at one side only to guide the stack of cans as a unit into the bin without the cans turning over manually controlled means to temporarily support such a stack of cans from adjacent the top of the bin in position to fall therein, conveyor means within the lower part of the bin arranged to move the cans when deposited therein toward one end of the bin, and means for ejecting the cans in single file from said end of the bin.

3. A can unloading apparatus comprising an elongated bin with side walls spaced to freely receive a stack of cans one can in depth, said bin being freely open on top and provided with manually controlled means to temporarily support such a stack of cans from adjacent the top of the bin in position to fall therein, an upwardly extending and backwardly tilted wall supporting the rear ends of the cans of the stack when temporarily supported as set out, conveyor means within the lower part of the bin arranged to move the cans when deposited therein toward one end of the bin, and means for ejecting the cans in single file from said end of the bin.

4. In a construction as set out in claim 3, said wall comprising a plate provided with means for detachably securing it along either edge of the bin.

5. A can unloading apparatus comprising an elongated bin with side walls spaced to freely receive a stack of cans one can in depth, said bin being freely open on top and provided with a bar extending along and revolvably supported adjacent the upper edge of the bin, a handle projecting from said bar for turning the same, and a row of fingers secured to and projecting from the bar arranged to swing in or out of the way of a stack of cans over the bin for temporarily supporting the cans above the bin and dropping them into the bin when the handle is operated.

6. In a structure as set out in claim 5, there being a bar with can supporting fingers as described on both sides of the bin for independent operation.

7. A can unloading apparatus comprising an elongated bin with side walls spaced to freely receive a stack of cans one can in depth, said bin being freely open on top and provided with a bar extending along and revolvably supported adjacent the upper edge of the bin, a handle projecting from said bar for turning the same, and a row of fingers secured to and projecting from the bar arranged to swing in or out of the way of a stack of cans over the bin for temporarily supporting the cans above the bin and dropping them into the bin when the handle is operated, and spring means normally turning the bar to project the fingers in the way of the cans for supporting them above the bin.

8. In a structure as set out in claim 7, a latch arranged for locking the fingers out of the way of the cans.

JOHN ALBERTOLI.

REFERENCES CITED

The following references are of record in the file of this patent:

UNITED STATES PATENTS

| Number | Name | Date |
|---|---|---|
| 1,451,450 | Smith | Apr. 10, 1923 |
| 1,954,944 | Olney | Apr. 17, 1934 |
| 1,972,489 | Rideout et al. | Sept. 4, 1934 |